United States Patent
Hodjat

(10) Patent No.: US 9,328,816 B2
(45) Date of Patent: May 3, 2016

(54) ISOLATOR DECOUPLER

(75) Inventor: Yahya Hodjat, Oxford, MI (US)

(73) Assignee: GATES CORPORATION, Denver, CO (US)

( * ) Notice: Subject to any disclaimer, the term of this patent is extended or adjusted under 35 U.S.C. 154(b) by 1213 days.

(21) Appl. No.: 12/928,537

(22) Filed: Dec. 14, 2010

(65) Prior Publication Data

US 2012/0149511 A1     Jun. 14, 2012

(51) Int. Cl.

| | |
|---|---|
| F16H 55/14 | (2006.01) |
| F16H 55/36 | (2006.01) |
| F16D 3/10 | (2006.01) |
| F16D 3/64 | (2006.01) |
| F16F 15/121 | (2006.01) |

(52) U.S. Cl.
CPC F16H 55/36 (2013.01); F16D 3/10 (2013.01); F16D 3/64 (2013.01); F16F 15/1215 (2013.01); F16H 2055/366 (2013.01)

(58) Field of Classification Search
USPC .............................. 464/74, 76, 82, 84; 474/94
See application file for complete search history.

(56) References Cited

U.S. PATENT DOCUMENTS

| | | | |
|---|---|---|---|
| 2,806,365 A | 9/1857 | Henning | |
| 459,325 A * | 9/1891 | Whitney | ..................... 144/250.1 |
| 4,050,266 A * | 9/1977 | Bergman | ........................ 464/76 |
| 5,788,576 A | 8/1998 | Varin | |
| 6,044,943 A | 4/2000 | Bytzek et al. | |
| 2001/0027133 A1 | 10/2001 | Kimura et al. | |
| 2002/0165053 A1 * | 11/2002 | Kimura et al. | .................. 474/70 |
| 2009/0305830 A1 | 12/2009 | Fiordaliso et al. | |
| 2010/0263992 A1 * | 10/2010 | Jones et al. | ................... 198/834 |

FOREIGN PATENT DOCUMENTS

| | | |
|---|---|---|
| CN | 1372623 A | 10/2002 |
| DE | 10311367 A1 | 10/2003 |
| JP | 2007263315 A | 10/2007 |
| KR | 10-2004-0006356 A | 1/2004 |

OTHER PUBLICATIONS

PCT/US2011/063643; Feb. 1, 2012; International Search Report and Written Opinion of the ISA.

* cited by examiner

*Primary Examiner* — William E Dondero
*Assistant Examiner* — Diem Tran
(74) *Attorney, Agent, or Firm* — Jeffrey A. Thurnau, Esq.; Paul N. Dunlap, Esq.

(57) ABSTRACT

An isolating decoupler comprising a pulley having a pulley inner surface, a hub having a radially extending arm, the radially extending arm having a frictional surface slidingly engaged with the pulley inner surface, a spring fixed to the pulley, the spring intermittently engageable with the radially extending arm, an elastomeric member disposed between the spring and the radially extending arm; and the radially extending arm intermittently engageable with a pulley stop.

12 Claims, 4 Drawing Sheets

ISOLATOR DECOUPLER

FIELD OF THE INVENTION

The invention relates to an isolating decoupler having an arm having a frictional surface slidingly engaged with a pulley inner surface, a spring having an intermittent engagement with the arm, and the radially extending arm intermittently engageable with a pulley stop.

BACKGROUND OF THE INVENTION

Diesel engines used for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range. However, although a crankshaft isolator can function very well in engine running speed range; it still presents problems during engine start-up or shut-down due to the natural frequency of the isolator itself.

An alternator decoupler/isolator can eliminate belt slipping at an alternator pulley, but it cannot resolve belt slip taking place at the crankshaft pulley. For some engines, a crankshaft isolator/decoupler and an alternator decoupler/isolator have to be used together. Unfortunately, this can add significant cost to the accessory drive system.

Representative of the art is U.S. Pat. No. 6,044,943 which discloses a crankshaft decoupler has a mounting hub, a pulley rotatably mounted on the mounting hub, an annular carrier mounted within said pulley, a biasing device mounted therebetween, and a one way clutch mounted between the annular carrier and the pulley. The biasing device cushions the belt drive from crankshaft impulses and lowers the angular resonant frequency of the belt system. The one way clutch prevents sudden reversal of the belt tension in the drive due to start/stop of the engine or sudden deceleration of the engine and prevents momentary reverse slip belt squeal as a result of the tensioners' inadequate output for the reverse mode. The one way clutch limits the maximum amount of torque which may be transmitted preventing belt slippage during momentary overload.

What is needed is an isolating decoupler having an arm having a frictional surface slidingly engaged with a pulley inner surface, a spring having an intermittent engagement with the arm, and the radially extending arm intermittently engageable with a pulley stop. The present invention meets this need.

SUMMARY OF THE INVENTION

The primary aspect of the invention is an isolating decoupler having an arm having a frictional surface slidingly engaged with a pulley inner surface, a spring having an intermittent engagement with the arm, and the radially extending arm intermittently engageable with a pulley stop.

Other aspects of the invention will be pointed out or made obvious by the following description of the invention and the accompanying drawings.

The invention comprises an isolating decoupler comprising a pulley having a pulley inner surface, a hub having a radially extending arm, the radially extending arm having a frictional surface slidingly engaged with the pulley inner surface, a spring fixed to the pulley, the spring intermittently engageable with the radially extending arm, an elastomeric member disposed between the spring and the radially extending arm; and the radially extending arm intermittently engageable with a pulley stop.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
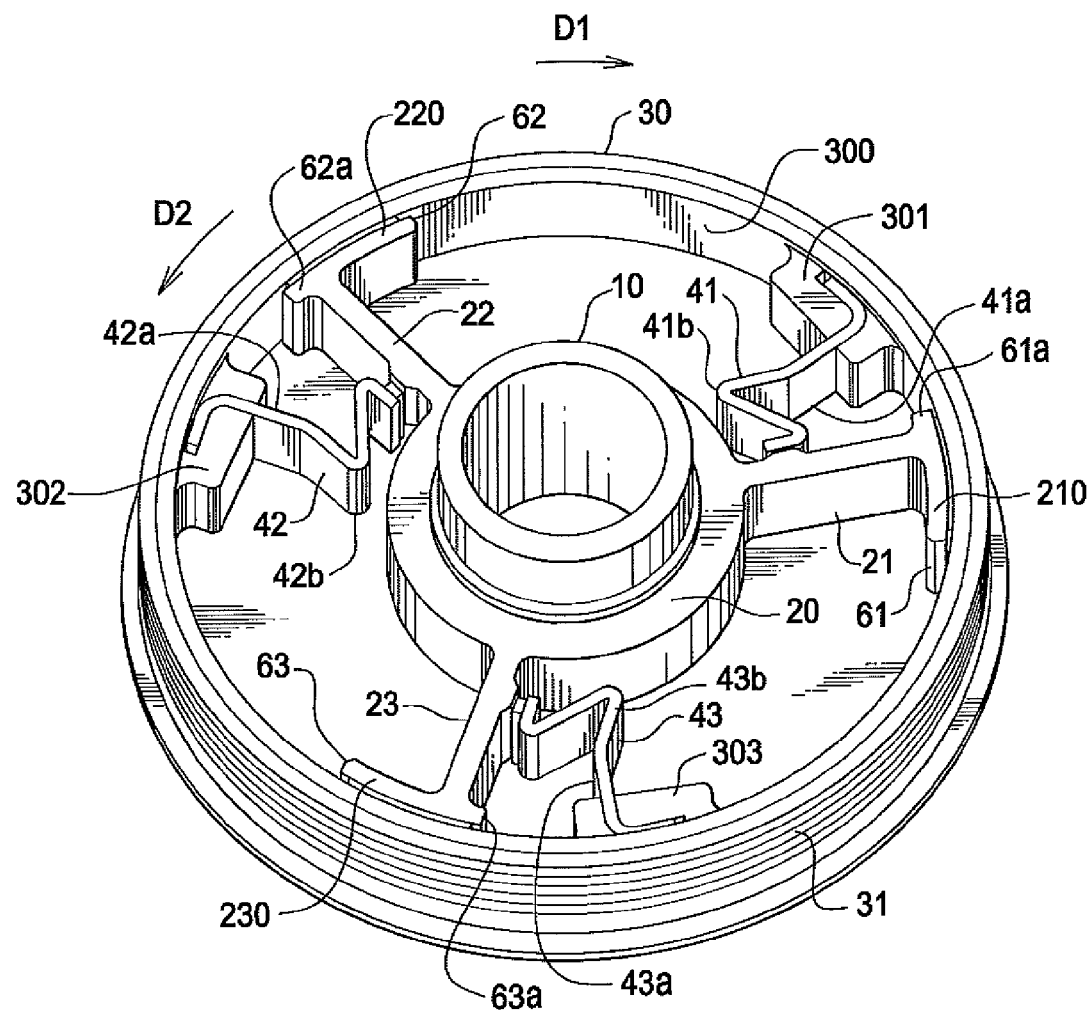
FIG. 1 is a front perspective view of the isolator decoupler.

FIG. 1 is a front perspective view of the isolator decoupler. The device comprises a shaft 10. Shaft 10 is used to connect the device to an engine crankshaft (not shown). Torque is transmitted from the crankshaft through shaft 10 to a hub 20. Shaft 10 can be press fit into hub 20 so that shaft 10 and hub 20 rotate together.

Hub 20 comprises radially extending arms 21, 22, 23. The radial extension is with respect to the axis of rotation A-A of shaft 10, see FIG. 2. Although the preferred number of arms 21, 22, 23 is three, any number of radially extending arms may be used with equal success for this device. The range of motion of the device is a function of the number of arms. Three radially extending arms allow a range of relative movement of approximately 120° between the hub 20 and pulley 30. For four radially extending arms the range of relative movement is approximately 90° and so on.

The end of each arm comprises a friction plate member 210, 220, 230. A friction member 211, 212, 213 is fixed on the end of each respective frictional plate member 210, 220, 230. Each friction member frictionally contacts an inner surface 300 of pulley 30. Inner surface 300 is a cylindrical section. Each frictional plate member 210, 220, 230 comprises an arcuate shape for engaging the inner surface 300.

The friction plate members allow relative motion between the pulley and the shaft during decoupling and re-coupling. Pulley 30 comprises a belt engaging surface 31 for contacting a belt. Belt engaging surface 31 may comprise a multi-ribbed profile as shown, or may also comprise any other profile known in the art such as toothed, flat, or a single v notch.

A spring member 41, 42, 43 extends from a mounting member 301, 302, 303 respectively. Each spring member 41, 42, 43 engages a radially extending arm 21, 22, 23 respectively. Each spring member 41, 42, 43 is loaded in a substantially cantilever manner. Each mounting member 301, 302, 303 also acts as a stop to stop a rotation of each radially extending arm during operation.

Each radially extending arm engages its respective spring during operation thereby allowing the transfer of torque from the crankshaft to the pulley while engine is in operation. The spring members 41, 42, 43 cushion and damp engine vibrations and isolate them from the pulley, and therefore, from the rest of the belt drive system.

For example, in a shaft 10 driving direction D1 friction plate member 210 will contact mounting member 301. In a shaft driving direction D2 friction plate member 210 will contact mounting member 302. Driving direction D1 is typically associated with engine deceleration. Driving direction D2 is typically associated with engine acceleration.

Each spring member comprises an arm 41a, 42a, 43a that bends in a cantilever bending mode. Each spring member also comprises an end 41b, 42b, 43b that has an accordion-like shape, or multiple bends, that are used in compression mode.

Each spring member shape can be varied in the bending area 41a, 42a, 43a by comprising various curves as well as in the accordion area by having different number of compression folds. Flexibility in the spring member design allows isolating of engine vibration to be designed and tuned according to the needs of any given engine. In addition to the many shapes that the spring member can have in its bend and compression areas, the thickness of it can also be varied to adjust the spring rate as needed. The simplest way of changing the spring member thickness is doubling or tripling its thickness in the desired areas.

Figure 2:
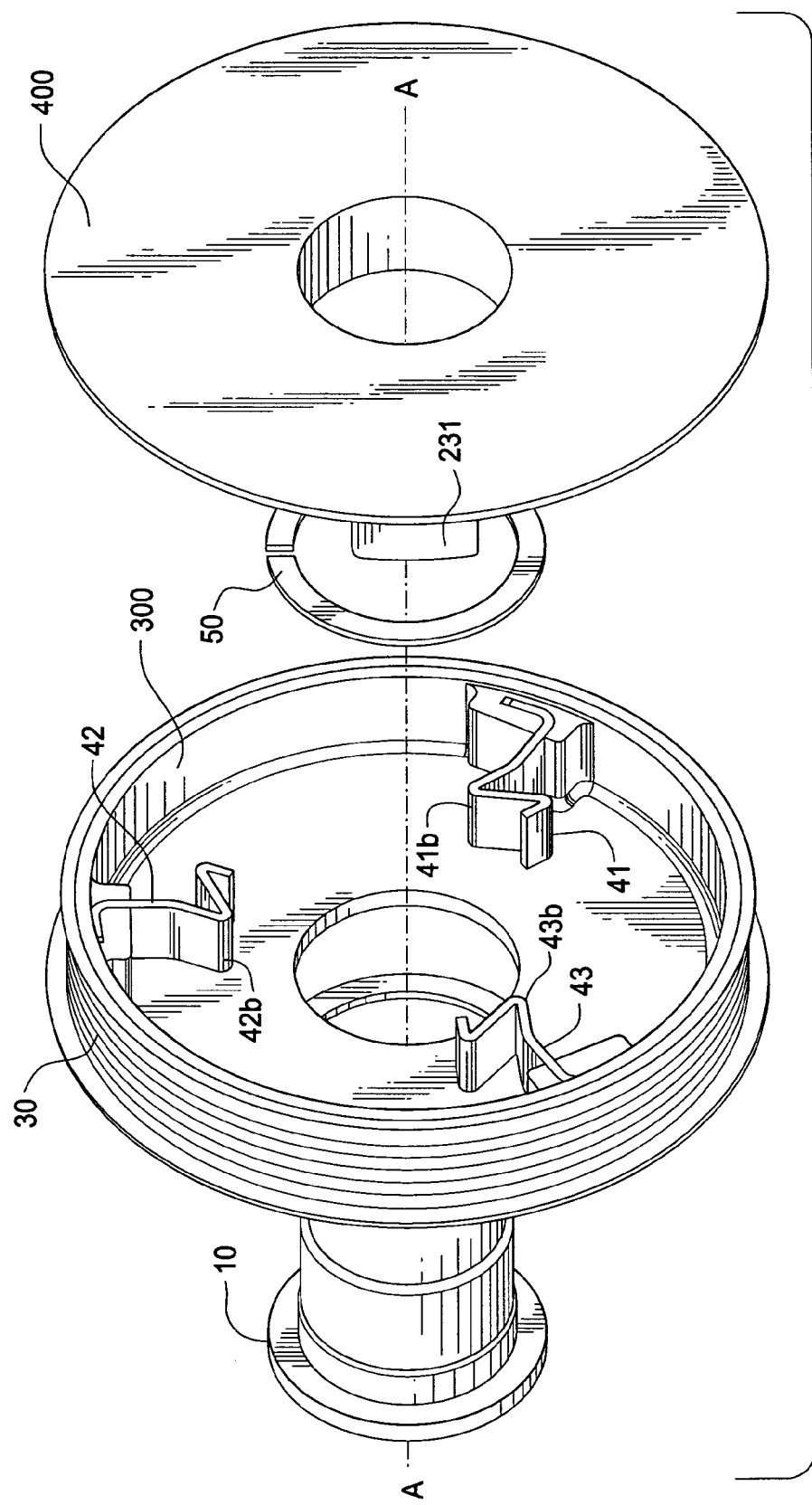
FIG. 2 is a front exploded view of the isolator decoupler.

FIG. 2 is a front exploded view of the isolator decoupler. Friction ring 50 damps a relative movement of the pulley 30 with respect to the hub 20. Friction ring 50 comprises materials known in the art.

Each radially extending arm 21, 22, 23 is attached to a plate 400, which plate also serves to enclose the interior of the device, thereby protecting it from debris.

Figure 3:
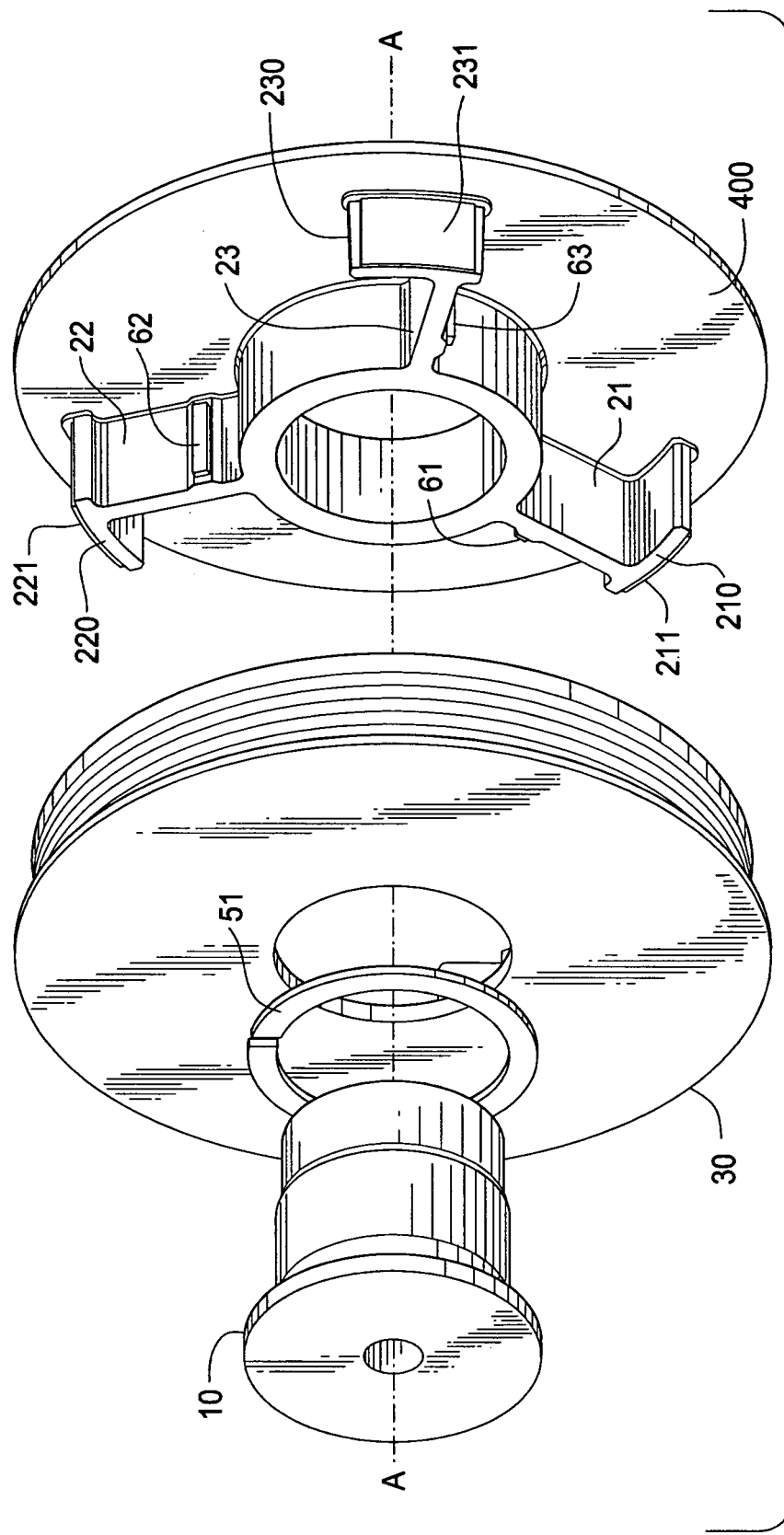
FIG. 3 is a rear exploded view of the isolator decoupler.

FIG. 3 is a rear exploded view of the isolator decoupler. Friction ring 51 damps a relative movement of the pulley 30 with respect to the hub 20. Friction ring 51 comprises materials known in the art.

Figure 3A:
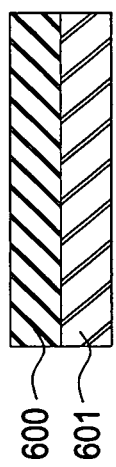
FIG. 3a is a cross-sectional view of the damping members.

FIG. 3a is a cross-sectional view of the damping members. Damping members 61, 62, 63 cushions the impacts between each spring member 41, 42, 43 and the respective radially extending arm 21, 22, 23. The lower level 601, which is attached to each radially extending arm, is an energy absorbing material known in the art to prevent a "knocking" sound and shock, and the second (top) layer 600, which contacts the end of the spring member, is a wear resistant elastomer or polymer also known in the art.

In an alternate embodiment, the points of contact points of each radially extending arm and spring under the damping members 61, 62, 63 is magnetized using a permanent magnet. This feature will keep the system always coupled. The amount of magnetization can be adjusted to enable decoupling at the desired decoupling force for the system. The decoupling force should overcome the magnetic force and separate the radially extending arm from the respective contact point. For example, this feature reduces unnecessary decoupling and re-coupling when engine is turned off, or with minute decoupling forces.

Figure 4:
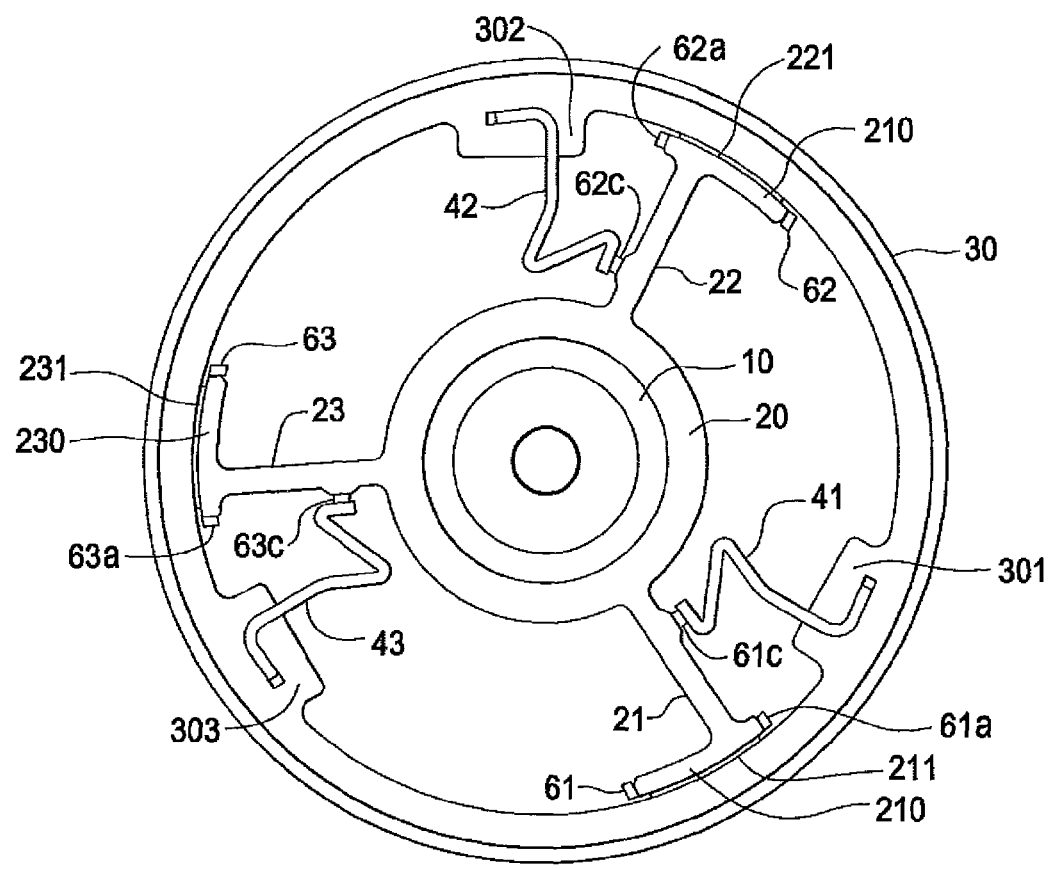
FIG. 4 is a front view of the isolator decoupler.

FIG. 4 is a front view of the isolator decoupler. The contact areas of metal-to-metal that are four points times the number of arms are all covered by at least two layers of elastomers or polymers. This results in a smooth decoupling action.

Upon deceleration of the engine, the arms and springs simply separate from each other and the arms move backwards over their friction plate contacts on the internal diameter of the pulley. This creates a very simple and efficient decoupling. Since most engines require about 15 degrees of decoupling, this device provides much more degrees of decoupling than required.

Although a form of the invention has been described herein, it will be obvious to those skilled in the art that variations may be made in the construction and relation of parts without departing from the spirit and scope of the invention described herein.

I claim:

1. An isolating decoupler comprising:
    a pulley (30) having a pulley inner surface (300);
    a hub (20) having a radially extending arm (21);
    the radially extending arm having a frictional surface (211) slidingly engaged with the pulley inner surface;
    a spring (41) fixed to the pulley;
    the spring intermittently engageable with the radially extending arm;
    an elastomeric member (61) disposed between the spring and the radially extending arm; and
    the radially extending arm intermittently engageable with a pulley stop (301).

2. The isolating decoupler as in claim 1 further comprising three radially extending arms, each radially extending arm comprising a frictional surface slidingly engaged with the pulley inner surface.

3. The isolating decoupler as in claim 2 further comprising three springs, each spring engaged with a radially extending arm.

4. The isolating decoupler as in claim 3 further comprising a damping member disposed between each radially extending arm and each spring.

5. The isolating decoupler as in claim 3 further comprising a damping member disposed between each radially extending arm and the pulley.

6. The isolating decoupler as in claim 1, wherein the spring comprises a cantilever bending portion and a folded portion.

7. The isolating decoupler as in claim 1 further comprising a friction ring disposed between the pulley and the hub.

8. The isolating decoupler as in claim 1, wherein the pulley inner surface comprises a cylindrical section.

9. The isolating decoupler as in claim 8, wherein the frictional surface is arcuate.

10. An isolating decoupler comprising:
    a pulley (30) having a pulley inner surface (300) describing a cylindrical section;
    a hub (20) having three radially extending arms (21, 22, 23);
    each radially extending arm having an arcuate frictional surface (211, 221, 231) slidingly engaged with the pulley inner surface;
    three springs (41, 42, 43) fixed to the pulley;
    one of each spring intermittently engageable with one of each radially extending arms;
    an elastomeric member (61, 62, 63) is disposed between each spring and each radially extending arm; and
    each radially extending arm intermittently engageable with a pulley stop (301, 302, 303).

11. The isolating decoupler as in claim 10 further comprising a friction ring member disposed between the hub and the pulley.

12. The isolating decoupler as in claim 10 further comprising a shaft attached to the hub.

* * * * *